(12) United States Patent
Tsujimura et al.

(10) Patent No.: US 8,437,084 B2
(45) Date of Patent: May 7, 2013

(54) OPTICAL LOW-PASS FILTER

(75) Inventors: Ichiro Tsujimura, Osaka (JP); Masaaki Nose, Osaka (JP); Yoshiharu Tanaka, Osaka (JP); Naoki Kubo, Hyogo (JP)

(73) Assignee: SONY Corporation, Tokyo (JP)

( * ) Notice: Subject to any disclaimer, the term of this patent is extended or adjusted under 35 U.S.C. 154(b) by 703 days.

(21) Appl. No.: 11/909,260

(22) PCT Filed: Jan. 17, 2007

(86) PCT No.: PCT/JP2007/050594
§ 371 (c)(1),
(2), (4) Date: Dec. 16, 2008

(87) PCT Pub. No.: WO2007/083661
PCT Pub. Date: Jul. 26, 2007

(65) Prior Publication Data
US 2011/0116162 A1    May 19, 2011

(30) Foreign Application Priority Data

Jan. 23, 2006  (JP) .................................. 2006-013666

(51) Int. Cl.
*G02B 1/10* (2006.01)
(52) U.S. Cl.
USPC ........................................ 359/585; 359/360
(58) Field of Classification Search .................. None
See application file for complete search history.

(56) References Cited

U.S. PATENT DOCUMENTS

| | | | |
|---|---|---|---|
| 3,094,436 A * | 6/1963 | Schroder | 428/446 |
| 4,504,109 A | 3/1985 | Taga et al. | |
| 5,667,880 A | 9/1997 | Okaniwa | |
| 5,993,614 A | 11/1999 | Nomura | |
| 6,852,406 B2 * | 2/2005 | Marechal et al. | 428/336 |
| 6,926,952 B1 * | 8/2005 | Weber et al. | 428/212 |
| 2003/0156080 A1 | 8/2003 | Koike et al. | |

FOREIGN PATENT DOCUMENTS

| | | |
|---|---|---|
| JP | 58-90604 A | 5/1983 |
| JP | 61-168899 A | 7/1986 |
| JP | 63-137301 U | 9/1988 |
| JP | 6-34802 A | 2/1994 |
| JP | 8-262225 A | 10/1996 |
| JP | 09-325211 A | 12/1997 |

(Continued)

OTHER PUBLICATIONS

International Search Report from the Japanese Patent Office, International Application No. PCT/JP2007/050594, Mar. 2, 2007.

*Primary Examiner* — Derek S Chapel
(74) *Attorney, Agent, or Firm* — Finnegan, Henderson, Farabow, Garrett and Dunner, LLP (57) ABSTRACT

On the light-entering surface side of a base material 10, a coating layer 11 in which a high-refractive layer and a low-refractive layer are sequentially disposed alternately on one on the other is provided for blocking infrared radiation. One of the high-refractive layers is configured by an ITO film 11a so that the conductivity is increased on the surface of the coating layer. Herein, in view of preventing, to a further extent, the attachment of dirt and dust by providing the conductivity to the surface of the coating layer, it is desirable if the outermost high-refractive layer is made of a transparent conductive material. Moreover, it is desirable if the total layer thickness is 140 nm or smaller for the refractive layers formed outside of the high-refractive layer made of the transparent conductive material.

17 Claims, 9 Drawing Sheets

FOREIGN PATENT DOCUMENTS

| | | |
|---|---|---|
| JP | 2000-221322 A | 8/2000 |
| JP | 2002-033468 A | 1/2002 |
| JP | 2002-251144 A | 9/2002 |
| JP | 2002-299594 A | 10/2002 |

* cited by examiner

OPTICAL LOW-PASS FILTER

TECHNICAL FIELD

The present invention relates to an optical low-pass filter (hereinafter, sometimes referred to simply as "low-pass filter") and, more specifically, to an optical low-pass filter provided with a coating layer effectively working for infrared blocking, antireflection, and others.

BACKGROUND ART

In recent years, an imaging apparatus such as still video camera or video camera is becoming rapidly popular for electronically storing images. With such an imaging apparatus, the image of an object formed by a camera lens is converted into an electric signal for every pixel by an imaging device such as CCD and CMOS, and the result is stored in a recoding medium as image data.

With such an imaging apparatus, because the imaging device includes regularly-aligned pixels on a light reception surface, when an object for imaging has any spatial frequency component approximated to a sampling spatial frequency that is determined by pixel spacing, moiré appears in the image data of the object. Moreover, because the imaging device has the spectral sensibility different from that of human eyes and high sensibility not only for visible radiation but also for infrared radiation, there needs to remove any infrared radiation from radiation to the object. Therefore, a low-pass filter and an infrared blocking filter are generally disposed between a camera lens and an imaging device.

The issue here is that optical devices such as low-pass filter and infrared blocking filter are each made of an insulation material, and thus are easily attached with dirt and dust due to static buildup easily caused by piezoelectric effects and pyroelectric effects. There is a problem that, when these optical devices are attached with dirt and dust, the shadows of the dirt and dust are possibly captured by the imaging device. With this being the case, the closer the dirt and dust to the imaging device, the more focused the dirt and dust will be. Therefore, the dirt and dust are to be clearly perceived in the captured image. Especially with a camera such as single-lens reflex camera in which the camera lens is exchangeable, it is highly possible that the dirt and dust get into the camera at the time of lens exchange, thereby easily causing the problem as above.

In order to prevent the attachment of dirt and dust due to static buildup, a proposal has been made to form a transparent conductive film on the surface of the optical device such as low-pass filter for the aim of removing the static electricity, for example. However, if the transparent conductive film is a coating film of metal or others, the light will be reflected on the coating film of metal because the coating film of metal is high in refraction index, thereby causing a new problem of reducing the light amount of the radiation to the object entering the imaging device.

In consideration thereof, in Patent Document 1, for example, proposed is to suppress the reflection on the surface of a low-pass filter by forming a transparent conductive film on the base surface of the low-pass filter, and an antireflective film over the conductive film.
[Patent Document 1] JP-A-2002-33468

DISCLOSURE OF THE INVENTION

Problems that the Invention is to Solve

With the technology proposed as such, the surface of the low-pass filter is indeed protected from attachment of dirt and dust and light reflection thereon, however, an optical device such as infrared blocking filter is required to be separately provided as with the previous technology. This has thus imposed limitations on size reduction of apparatus. Moreover, the number of components is large, and thus the productivity has not been high.

The invention is proposed in consideration of such previous problems, and an object thereof is to provide an optical low-pass filter that can effectively prevent attachment of dirt and dust caused by static buildup without increasing the number of components and processes for manufacturing.

Another object of the invention is to provide an imaging unit and an imaging device with which the number of components is small, the manufacturing productivity is high, the size reduction is possible, and the high image quality can be derived.

Means for Solving the Problems

In order to achieve the above-described objects, an optical low-pass filter of the invention is provided with a base material, and a coating layer formed to the base material on the light-entering surface side. The coating layer includes a high-refractive layer and a low-refractive layer sequentially disposed alternately on one on the other for reflecting or passing through a light of a specific wavelength range, and at least one of the high-refractive layers is made of a transparent conductive material so that the attachment of dirt and dust to the surface of the coating layer is prevented.

Herein, the coating layer may be the one that blocks infrared radiation.

Moreover, in view of suppressing, to a further extent, the attachment of dirt and dust by providing the conductivity to the surface of the coating layer, it is preferable if the outermost high-refractive layer is made of a transparent conductive material. Furthermore, a total layer thickness is desirably 140 nm or smaller for the refractive layers formed outside of the high-refractive layer made of the transparent conductive material.

Still further, in view of suppressing the light reflex loss on the high-refractive layer made of the transparent conductive material while keeping the conductivity of the surface of the coating layer, the layer thickness of the high-refractive layer is preferably in the range of 200 to 300 nm.

Still further, in view of suppressing the light reflex loss in the visible light region by the coating layer, the layer thickness of the low-refractive layer on the base material side being in contact with the high-refractive layer made of the transparent conductive material is preferably in the range of 140 to 220 nm.

Still further, in view of suppressing the light absorption, preferably, the transparent conductive material is a mixture of indium oxide and tin oxide, and a mixture ratio of the indium oxide is 90 weight percentage or higher.

Preferably, the outermost low-refractive layer is configured as an equivalent layer at least of two layers of $MgF_2$ layer and $SiO_2$ layer, and the $MgF_2$ layer and the $SiO_2$ layer are disposed in order from the outside. Herein, preferably, the layer thickness of the $MgF_2$ layer and that of the $SiO_2$ layer are each in the range of 20 to 80 nm.

An imaging unit according to the invention of achieving the above-described objects is characterized by including any one of the above-described optical low-pass filters, and an imaging device, and in the imaging unit, the coating layer of the optical low-pass filter is connected to a ground potential.

Further, an imaging device of the invention is characterized by including the imaging unit.

Advantage of the Invention

With the optical low-pass filter of the invention, a light of a specific wavelength range is reflected or passed through. A coating layer in which a high-refractive layer and a low-refractive layer are sequentially disposed alternately on one on the other is formed on the surface of the base material, and at least one of the high-refractive layers of the coating layer is made of a transparent conductive material. The configuration can thus achieve, all at once, the coating of reflecting or passing through the light of a specific wavelength range, and the ensuring of the conductivity on the surface of the low-pass filter. This eliminates the need to provide a conductive member separately from a coating member of reflecting or passing through a light of a specific wavelength range, thereby being able to effectively prevent the attachment of dirt and dust to the surface of the low-pass filter while suppressing the cost.

Moreover, if the outermost high-refractive layer is made of a transparent conductive material, the attachment of dirt and dust can be prevented to a further extent. Further, when the total layer thickness is 140 nm or smaller for the refractive layers formed outside of the high-refractive layer made of the transparent conductive material, the coating layer can have the satisfactory conductivity on the surface, and a simple grounding configuration allows grounding so that the attachment of dirt and dust can be prevented to a further degree.

Further, if the layer thickness is in the range of 200 to 300 nm for the high-refractive layer made of the transparent conductive material, the light reflex loss can be suppressed on the coating layer while the conductivity is being retained on the surface of the coating layer.

When the layer thickness is in the range of 140 to 220 nm for the low-refractive layer on the base material side being in contact with the high-refractive layer made of the transparent conductive material, the light reflex loss can be suppressed in the visible light region by the coating layer.

When the transparent conductive material is a mixture of indium oxide and tin oxide with a mixture ratio of the indium oxide being 90 weight percentage or higher, the light absorption can be suppressed.

When the outermost low-refractive layer is configured as an equivalent layer at least of two layers of $MgF_2$ layer and $SiO_2$ layer, and when the $MgF_2$ layer and the $SiO_2$ layer are disposed in order from the outside, the result will show excellent solvent-resistance and environment-resistance while suppressing the attachment of dirt and dust. This serves more effects when the layer thickness of the $MgF_2$ layer and that of the $SiO_2$ layer each fall in the range of 20 to 80 nm.

With the imaging unit and the imaging device of the invention, the optical low-pass filter is any of those described above, and thus the previously-provided optical device that reflects or passes through a light of a specific wavelength range can be eliminated so that the productivity can be increased, and the apparatus can be reduced in size. Moreover, because the surface of the optical low-pass filter can be protected from attachment of dirt and dust, the resulting captured image can be high in image quality.

BEST MODE FOR CARRYING OUT THE INVENTION

In the below, an embodiment of the invention is described by referring to the accompanying drawings. Note here that the invention is not at all restrictive to such an embodiment.

Figure 1:
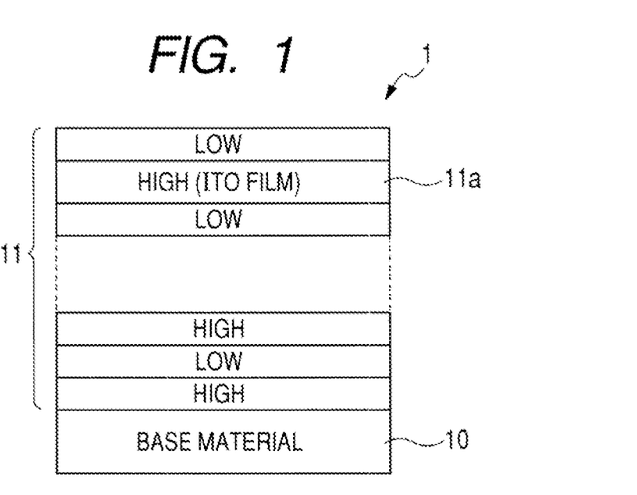
FIG. 1 is a schematic diagram showing an exemplary low-pass filter of the invention.

FIG. 1 is a schematic diagram showing an embodiment of a low-pass filter in the invention. A low-pass filter 1 in the drawing includes a coating layer 11 of blocking infrared radiation formed on the surface of a base material 10. The coating layer 11 of blocking the infrared radiation includes a high-refractive layer and a low-refractive layer sequentially disposed alternately on one on the other. One of the high-refractive layers is configured by an ITO (Indium Tin Oxide) film 11a made of a mixture of indium oxide and tin oxide being a transparent conductive material. With such a configuration, the surface of the coating layer is increased in conductivity, and the attachment of dirt and dust due to static buildup can be effectively prevented.

Among the high-refractive layers configuring the coating layer 11, there is no specific restriction on which high-refractive layer is to be made of a conductive material, but the closer to the surface of the coating layer, the more the effects thereof, and the further from the surface of the coating surface, the less the effects thereof. As such, it is recommended to form the outermost high-refractive layer using a transparent conductive material. Note that the outermost layer of the coating layer 11 is generally a low-refractive layer, and thus the outermost high-refractive layer is generally the second layer from the outside.

Figure 2:
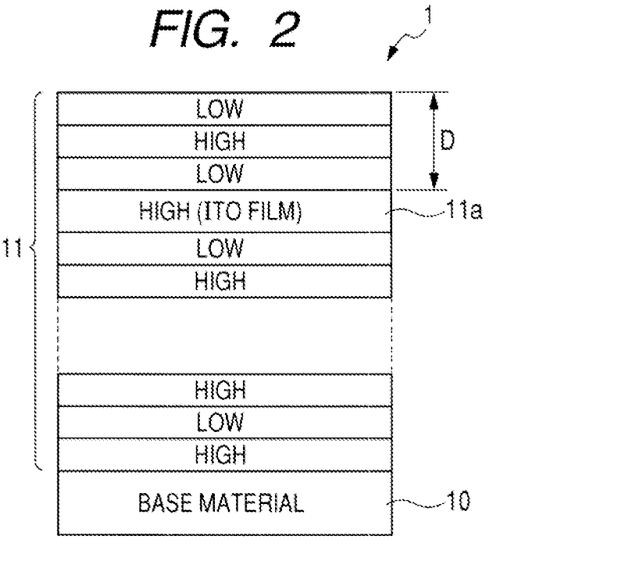
FIG. 2 is a schematic diagram showing another exemplary low-pass filter of the invention.

As shown in FIG. 2, any of the high-refractive layers other than the outermost high-refractive layer may be made of the transparent conductive material. If this is the case, desirably, the total layer thickness D is 140 nm or smaller for the refractive layers formed outside of the high-refractive layer made of the transparent conductive material. When the total layer thickness D exceeds 140 nm, there is a possibility that the surface of the coating layer will not have sufficiently-high conductivity, whereby the effects of preventing the attachment of dirt and dust may not serve well enough.

Moreover, there is no specific restriction on the layer thickness for the high-refractive layer made of the transparent conductive material, and may be determined as appropriate based on the specific material used for the transparent conductive material, the position of forming the layer made of the transparent conductive material, and others. The range of 200 to 300 nm is generally desirable. When the layer thickness of the high-refractive layer made of the transparent conductive material is thinner than 200 nm, there is a possibility that the surface of the coating layer is not provided with sufficient conductivity. On the other hand, when the layer thickness exceeds 300 nm, there is a possibility that the light absorption occurs in the high-refractive layer. The more-preferable layer thickness is in the range of 210 to 260 nm.

The outermost layer of the coating layer is generally a low-refractive layer as described above. This outermost layer is a layer directly attached with dirt and dust, and it is thus desirable to be made of a material hardly causing, physically, dirt and dust attachment. For the material being non-sticky with low refraction index, a fluorine compound, especially $MgF_2$ is considered suitable. In consideration thereof, the inventor et al. of the invention has conducted an experiment using $MgF_2$ for the outermost layer of the coating layer. The experiment result is shown in Table 1. Note that, in this experiment, an ITO film is formed on the surface of a soda-lime glass, and a low-refractive layer is formed thereon to go through the following solvent test and reliability test, and to evaluate the performance of dirt and dust falling-off.

(Solvent Test)

[EE3310] (washing solvent manufactured by Olympus Imaging Corp.), using a lens-cleaning paper soaked with a solvent of ethanol and another soaked with a solvent of IPA (isopropyl alcohol), samples are each wiped for 50 reciprocating motions with the weighing of 200 g, and then the surfaces of the samples are evaluated by visual observations. The evaluation criteria are as below. [○]: good, [Δ]: slight problem is observed but practically no problem, [x]: practical problem is observed (Reliability Test)

In a thermal shock test, a sample is put under, alternately for an hour, the environment of −30 degrees and that of +70 degrees, and this is repeated for 10 cycles. Thereafter, the surface of the sample is evaluated by visual observations.

In a temperature/humidity test, a sample is left for 500 hours under the environment of each temperature and humidity, and then for 24 hours under the room temperature and the room humidity. Thereafter, the surface of the sample is evaluated by visual observations.

The evaluation criteria are the same as those for the solvent test.

(Performance of Dirt and Dust Falling-Off)

Powders of alumina or others are scattered on the surface of a low-pass filter, and the low-pass filter is vibrated by a predetermined amount for a predetermined length of time. Thereafter, the remaining amount of powders on the surface of the low-pass filter is evaluated by visual observations. The evaluation criteria are as below. [○]: almost gone, [Δ]: remains with the level of no influence on image, [x]: remains with the level of influence on image

TABLE 1

| Experiment No. | ITO (nm) | SiO$_2$ (nm) | MgF$_2$ (nm) | Solvent Test | | | Reliability Test | | | | | Performance of Dirt and Dust Falling-Off |
| --- | --- | --- | --- | --- | --- | --- | --- | --- | --- | --- | --- | --- |
| | | | | EE3310 | Ethanol | IPA | thermal shock test | 35° C./85% | 60° C./90% | 70° C./80% | 70° C./ no humidity | |
| 1 | 240 | 90 | 0 | ○ | ○ | ○ | ○ | ○ | ○ | ○ | ○ | Δ |
| 2 | 240 | 0 | 90 | Δ fog | Δ fog | Δ fog | ○ | ○ | ○ | Δ fog | ○ | ○ |
| 3 | 240 | 47 | 47 | ○ | ○ | ○ | ○ | ○ | ○ | ○ | ○ | ○ |
| 4 | 240 | 22 | 72 | Δ fog | ○ | ○ | ○ | ○ | ○ | ○ | ○ | ○ |
| 5 | 240 | 66 | 20 | ○ | ○ | ○ | ○ | ○ | ○ | ○ | ○ | Δ |
| 6 | 0 | 0 | 90 | ○ | ○ | ○ | ○ | ○ | ○ | ○ | ○ | X |
| 7 | 0 | 47 | 47 | ○ | ○ | ○ | ○ | ○ | ○ | ○ | ○ | X |
| 8 | 0 | 22 | 72 | ○ | ○ | ○ | ○ | ○ | ○ | ○ | ○ | X |
| 9 | 0 | 66 | 20 | ○ | ○ | ○ | ○ | ○ | ○ | ○ | ○ | X |

Layer Configuration of Sample
MgF$_2$
SiO$_2$
ITO Film
Glass

In Table 1, with the sample of Experiment No. 1 in which the outermost layer is an SiO$_2$ layer being a low-refractive layer, the solvent test and the reliability test show good results, but a slight problem is observed for the performance of dirt and dust falling-off. On the other hand, with the sample of Experiment No. 2 in which the outermost layer is an MgF$_2$ layer being a low-refractive layer, the performance of dirt and dust falling-off shows good result but "fog" is observed in the solvent test. Note that, with the samples of Experiment Nos. 6 to 9 formed with no ITO film, all show a practical problem for the performance of dirt and dust falling-off.

In consideration thereof, the inventor et al. of the invention has come up with an idea that a low-refractive layer being the outermost layer of the coating layer may be configured as an equivalent layer at least of two layers of MgF$_2$ layer and SiO$_2$ layer, and if so, the disadvantages of these two layers may be complemented each other. The samples 3 to 5 are thus manufactured for evaluation. Herein, the layers are disposed one on the other in order of ITO film, SiO$_2$ layer, and MgF$_2$ layer. As a result, assuming that the outermost layer of the coating layer is an equivalent layer of two layers of MgF$_2$ layer and SiO$_2$ layer, the solvent test, the reliability test, and the performance of dirt and dust falling-off are found out as all showing the excellent results. For the MgF$_2$ layer and the SiO$_2$ layer formed as an outermost layer of the coating layer, the layer thickness is preferably in the range of 20 to 80 nm, and the more preferable lower bound value is 30 nm.

Figure 3:
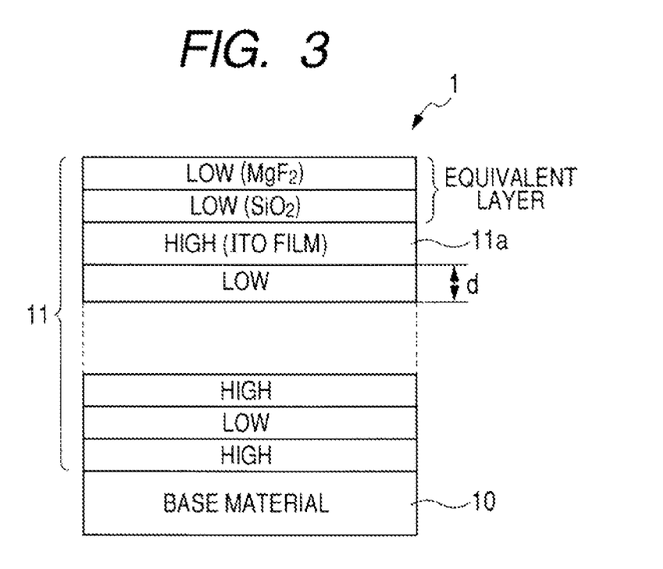
FIG. 3 is a schematic diagram showing still another exemplary low-pass filter of the invention.
Figure 4:
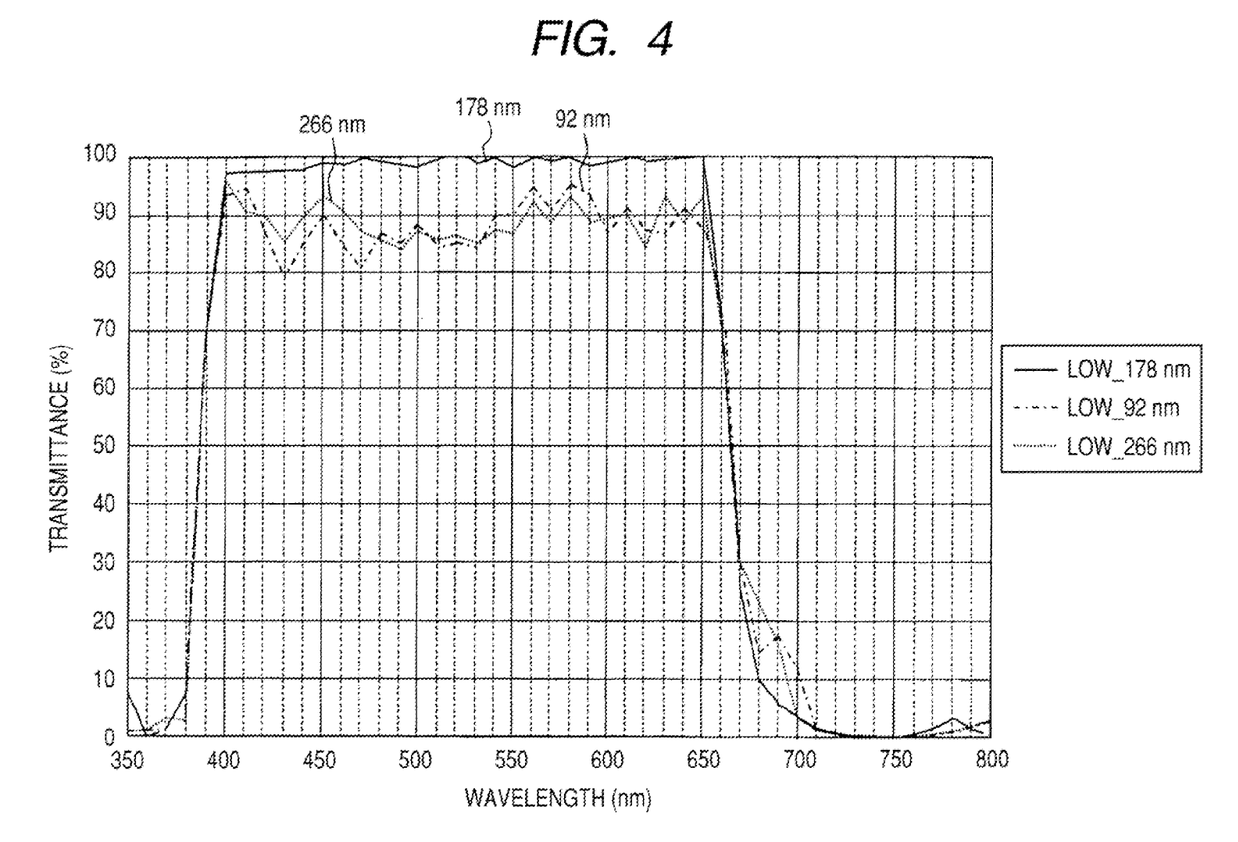
FIG. 4 is a graph showing the transmittance when a low-refractive layer directly beneath an ITO film is changed in layer thickness.

Moreover, a layer thickness d (shown in FIG. 3) of the low-refractive layer located below the high-refractive layer made of a transparent conductive material is preferably in the range of 140 to 220 nm. With the sample of the layer configuration of FIG. 3, the layer thickness d is changed to 92, 178, and 266 nm, and the transmittance of the sample is simulated. The experiment result is shown in FIG. 4.

As is evident from the drawing, when the layer thickness d of the low-refractive layer is 178 nm, the transmittance of the wavelength in the visible light region is substantially 100%. On the other hand, when the layer thickness d is 92 nm and 266 nm, the transmittance of the wavelength in the visible light region is 80 to 95%, and the light reflex loss is observed in the coating layer.

The transparent conductive material for use in the invention can be of any previously well-known, and includes antimony oxide, indium oxide, tin oxide, zinc oxide, ITO (Tin-doped Indium Oxide), ATO (Antimony-doped Tin Oxide), and others. Among these, ITO is preferable.

Figure 5A:
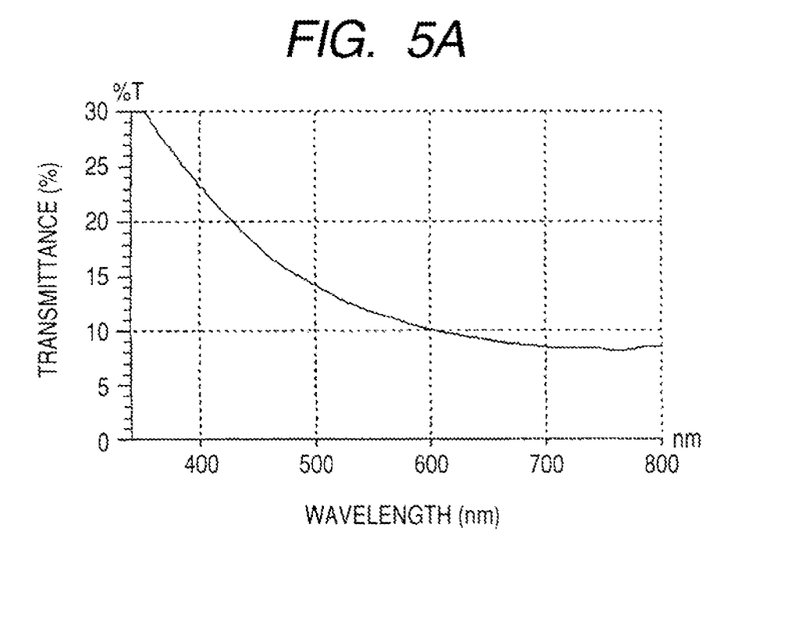
FIG. 5A is a graph showing the light absorption when the mixture ratio is changed between indium oxide and tin oxide.
Figure 5B:
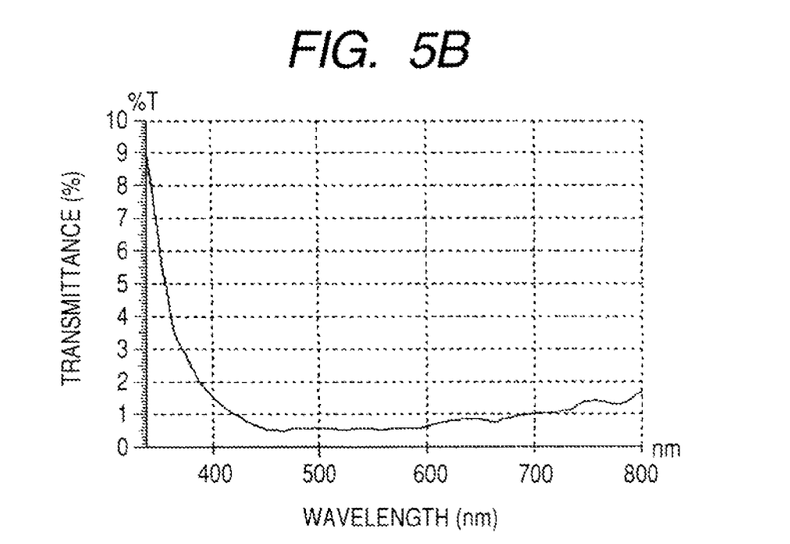
FIG. 5B is a graph showing the light absorption when the mixture ratio is changed between indium oxide and tin oxide.
Figure 6A:
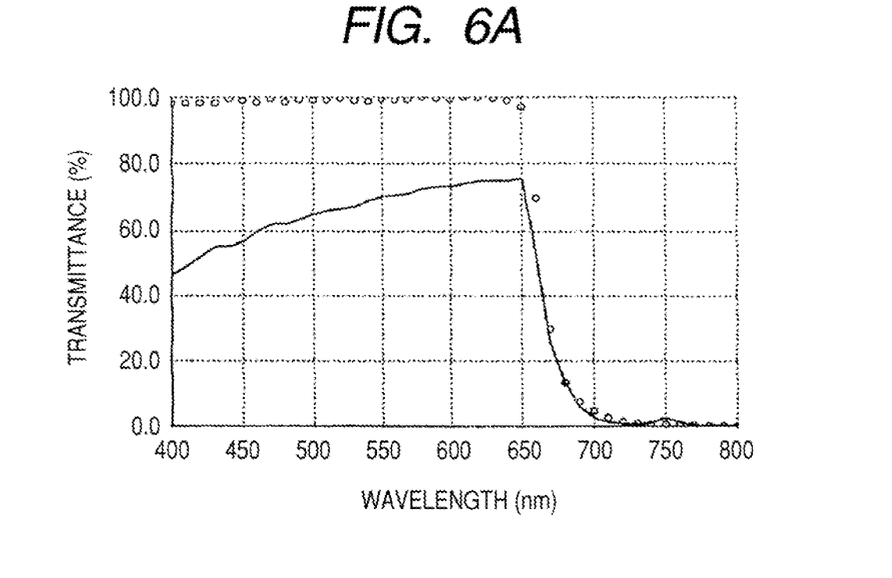
FIG. 6A is a graph showing the light transmittance when the mixture ratio is changed between indium oxide and tin oxide.
Figure 6B:
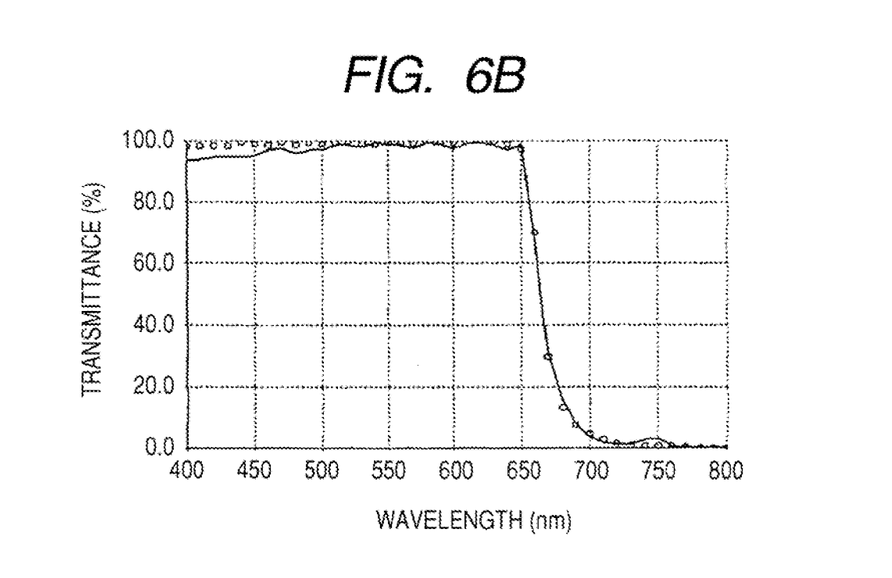
FIG. 6B is a graph showing the transmittance when the mixture ratio is changed between indium oxide and tin oxide.

The inventor et al. of the invention also gives careful consideration to the mixture ratio of the indium oxide and tin oxide in the ITO. The experiment results derived by changing the mixture ratio of indium oxide ($InO_3$) and the tin oxide ($SnO_2$) are shown in FIGS. 5A, 5B, 6A, and 6B. FIGS. 5A and 5B are each a graph showing the amount of light absorption for every wavelength with the lateral axis of wavelength (nm), and the vertical axis of light absorption (%). FIGS. 6A and 6B are each a graph showing the transmittance for every wavelength with the lateral axis of wavelength (nm) and the vertical axis of transmittance (%).

FIG. 5A is a graph showing the amount of light absorption in an ITO film with $InO_3$:$SnO_2$ being 86:14 by weight ratio, and $InO_3$:$SnO_2$ is 95:5 thereby in FIG. 5B. Through comparison of these graphs, it is known that the light absorption in the visible light region is smaller in the ITO film with $InO_3$:$SnO_2$ being 95:5. FIG. 6A is a graph showing the transmittance of an ITO film with $InO_3$:$SnO_2$ being 86:14 by weight ratio, and $InO_3$:$SnO_2$ is 95:5 thereby in FIG. 6B. Through comparison of these graphs, it is known that the transmittance in the visible light region is better in the ITO film with $InO_3$:$SnO_2$ being 95:5. These experiment results tell that, as a transparent conductive material for use in the invention, the ITO in which the mixture ratio of indium oxide is 90 weight percent or more is preferable.

The material for use as a base material of a low-pass filter is exemplified by quartz, lithium niobate, vanadium tetraoxide, and others. As to the layer configuration of the coating layer, a high-refractive layer and a low-refractive layer may be alternately disposed on one on the other, and it may be so formed as to work to derive any expected effects such as working for infrared blocking and antireflection. If with a coating layer provided for the aim of infrared blocking, for example, the total number of layers will be about 30 to 40. The material for a high-refractive layer in the coating layer is preferably at least one of titanium oxide, tantalum oxide, a mixture of titanium oxide and lanthanum oxide, and a mixture of titanium oxide and tantalum oxide. The material for a low-refractive layer is preferably at least one of silicon oxide, aluminum oxide, and a mixture of silicon oxide and aluminum oxide.

The forming method of the coating layer is not specifically restrictive, and any previously-known method can be used, e.g., vacuum deposition, IAD (Ion Assist Deposition), IP (Ion Plating), CVD (Chemical Vapor Deposition), sputtering, and others.

In view of suppressing the physical absorption of dirt and dust, the coating layer may be surely coated thereon also with fluorine. With this being the case, the film thickness of the fluorine coating film is required to be in the range not influencing the optical characteristics. Specifically, about a few nm is considered preferable.

Figure 7:
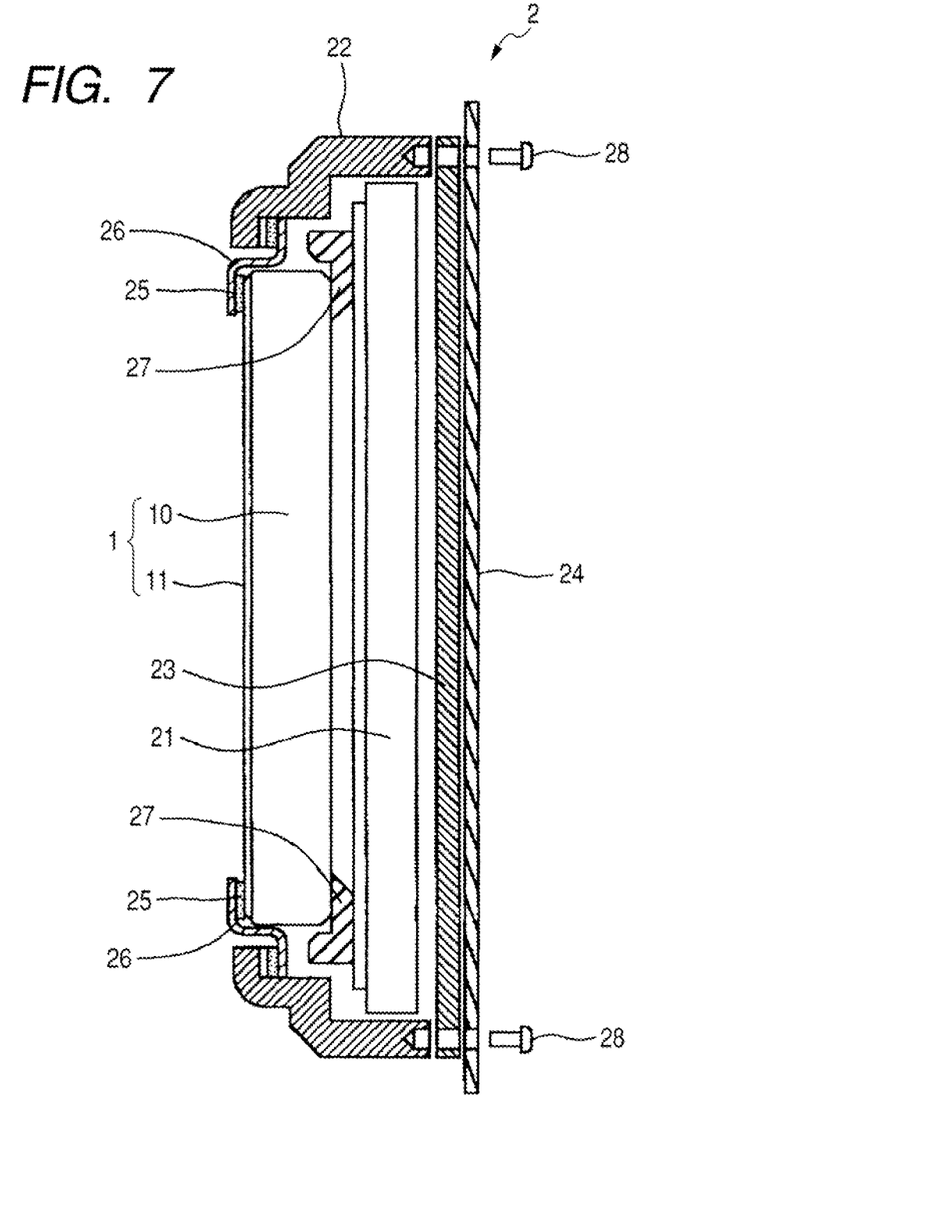
FIG. 7 is a schematic diagram showing an exemplary imaging unit of the invention.

FIG. 7 shows a schematic diagram of an imaging unit 2 using the optical low-pass filter 1 of the invention. The imaging unit 2 of FIG. 7 is provided with: a box-shaped housing 22 formed with an aperture on the front and rear surfaces; a leaf spring 26 attached, with a substantially "S"-shaped cross section, to the outer edge portion of the aperture on the front surface to protrude inward of the aperture; the low-pass filter 1 attached as if abutting the inner surface of the leaf spring 26 via a mask sheet 25; a CCD (Charge Coupled Device) 21 being an imaging device attached to oppose the low-pass filter 1 with a space therefrom via a spacer 27, a radiator plate 23 attached to seal the aperture on the rear surface of the housing 22; and a substrate 24 attached to the rear surface of the radiator plate 23. Into a screw hole punched in the end surface of the housing 22 on the rear surface side, in the state that a through hole formed to the radiator plate 23 is aligned with that formed to the substrate 24, a screw 28 is screwed together the screw hole after going through the through holes from the outside so that the components are combined together as a piece. On the surface of the base material 10 of the low-pass filter 1, the infrared blocking coating layer 11 is formed, and as shown in FIG. 3, a high-refractive layer located outermost in the infrared blocking coating layer 11 is formed by the ITO film 11a. The infrared blocking coating layer 11 is connected to the ground potential via the mask sheet 25, the leaf spring 26, the hosing 22, and the substrate 24.

With the imaging unit 2 of such a configuration, although any special configuration has been required to keep the conductivity, the simple configuration enables to keep the conductivity and an infrared blocking filter, and the number of components can be reduced. Moreover, this also enables size reduction of the apparatus.

The CCD 21 used herein is configured by a so-called one-chip color area sensor of so-called Bayer type, in which the surfaces of CCDs in the two-dimensionally-disposed area sensor are attached with color filters of R (red), G (green), and B (blue) in a checkered pattern. In this embodiment, it has 3008 (X direction)×2000 (Y direction)=6016000 pixels, for example.

Note that the imaging device for use in the invention is not restrictive to the CCD, and any other previously-known devices such as CMOS and VMIS can be used.

Figure 8A:
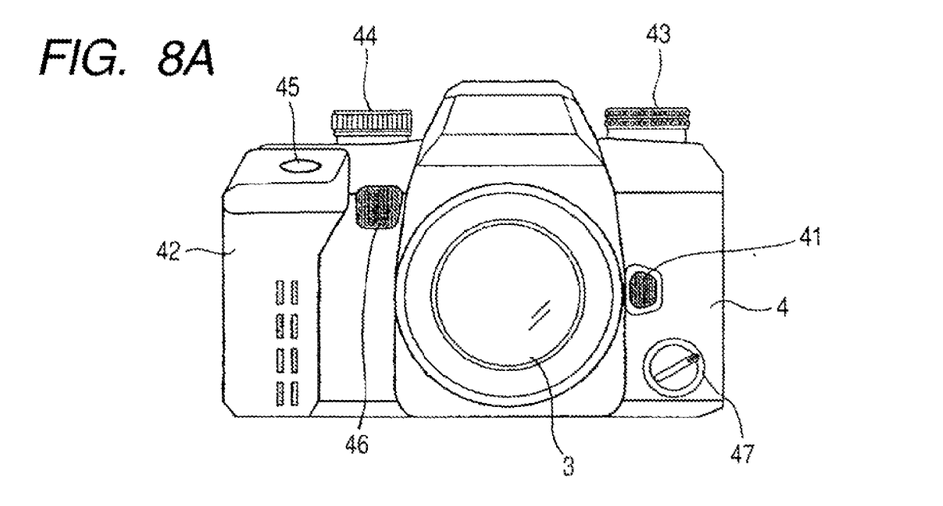
FIG. 8A is a front view of an exemplary camera (imaging device) of the invention.
Figure 8B:
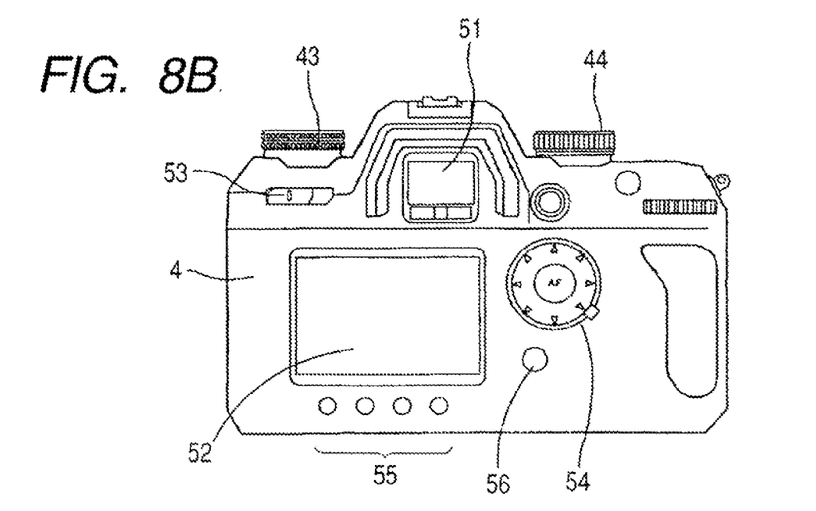
FIG. 8B is a rear view of the exemplary camera (imaging device) of the invention.

FIGS. 8A and 8B show an exemplary still video camera equipped with the optical low-pass filter and the imaging unit of the invention. FIG. 8A is a front view of the still video camera of the invention, and FIG. 8B is a rear view thereof.

The still video camera of FIGS. 8A and 8B is a single-lens-reflex still video camera provided with a camera body 4, and an interchangeable lens 3 being attachable/removable to/from at the substantial center on the front surface of the camera body 4. The camera body 4 is provided with: a mount section (not shown) for attachment of the interchangeable lens 3 at substantially the center on the front surface; a lens exchange button 41 for attaching/removing the interchangeable lens to/from the area in the vicinity of the mount section; a grip section 42 for a user to hold at the left end portion on the front surface; an illumination window 46 from which a light exits for use to measure the distance from an object; a control value setting dial 43 for use to set a control value at the upper right portion on the front surface; a mode setting dial 44 for use to switch a shooting mode at the upper left portion on the front surface; a release button 45 for use to issue a command of starting/ending exposure on the upper surface of the grip section 42; and an AF mode setting dial 47 for use to switch an auto focus mode at the lower right portion on the front surface. In the vicinity of the mount section, provided are a plurality of electrical contact points (not shown) for establishing an electric connection with the attached interchangeable lens 3, and a plurality of couplers (not shown) for establishing a mechanical connection.

The electrical contact points are provided for sending out, from a lens ROM (Read Only Memory) equipped in the interchangeable lens 3 to a control section inside of the camera body 4 (refer to FIG. 10), information unique to the lens (information about aperture F value, focus distance, and others), or for sending out, to the control section, information about the position of a focus lens in the interchangeable lane 3 or position of a zoom lens therein, for example.

The couplers are provide for transmitting, to the lenses in the interchangeable lens 3, the driving force of a focus lens driving motor equipped in the camera body 4, and the driving force of a zoom lens driving motor equipped therein.

The mode setting dial 44 is provided for setting a plurality of shooting modes including a still image shooting mode for shooting still images, and a moving image shooting mode for shooting moving images.

The release button 45 is so configured as to be operated with "half depression state" in which the button is half-depressed, and with "full depression state" in which the button is further depressed. In the still image shooting mode, when the release button 45 is half depressed, the preparation operation (preparation operation for setting of exposure control value, or for focus adjustment) is executed for shooting of still images of an object. When the release button 45 is fully depressed, the shooting operation (a series of operation of exposing a color imaging device that will be described later, and applying predetermined image processing to an image signal being a result of the exposure for storage into a memory card) is executed. In the moving image shooting mode, when the release button 45 is fully depressed, the shooting operation (a series of operation of exposing a color imaging device, and applying predetermined image processing to an image signal being a result of the exposure for storage into a memory card) is started, and when the release button 45 is fully depressed again, the shooting operation is ended.

In FIG. 8B, at the substantially upper center of the rear surface of the camera body 4, a finder window 51 is provided. To the finder window 51, the image of an object is guided from the interchangeable lens 3. The person who is in charge of imaging looks into the finder window 51 so that he or she can perceive the object. At substantially the center of the rear surface of the camera body 4, an external display section (liquid crystal display section) 52 is provided. In this embodiment, the external display section 52 is exemplified by a color liquid crystal display device with 400 (X direction)×300 (Y direction)=120000 pixels, for example. It serves to display a menu screen for setting of a mode about exposure control in a recording mode, a mode about shooting scenes, shooting requirements, and others, or for reproducing and displaying any captured image recorded on a memory card in a reproduction mode, for example.

On the upper left portion of the external display section 52, a main switch 53 is provided. The main switch 53 is a two-position slide switch, and when a contact point is set to the "OFF" position on the left side, the power is turned off, and when the contact point is set to the "ON" position on the right side, the power is turned on.

On the right side of the external display section 52, a jog dial key 54 is provided. The jog dial key 54 is provided with a circular operation button, and in this operation button, depression operations in four directions of up, down, right, and left, and the depression operations in four directions of upper right, upper left, lower right, and lower left are respectively detected.

The jog dial key 54 is of multi-function, and functions as an operation switch for changing any item selected on a menu screen displayed on the external display section 52 for setting of shooting scene, and functions as an operation switch for changing a frame being a reproduction target selected on an index screen on which a plurality of thumbnail images are aligned and displayed, for example. The jog dial key 54 can also serve as a zoom switch for changing the focus distance of a zoom lens of the interchangeable lens 3.

On the right side of the external display section 52, a camera shake correction switch 56 is provided. When the camera shake correction switch 56 is turned on, the camera shake correction function is activated. At the lower position of the external display section 52, as a switch for operation execution about display making or display details on the external display section 52, various types of switches 55 are provided.

Figure 9A:
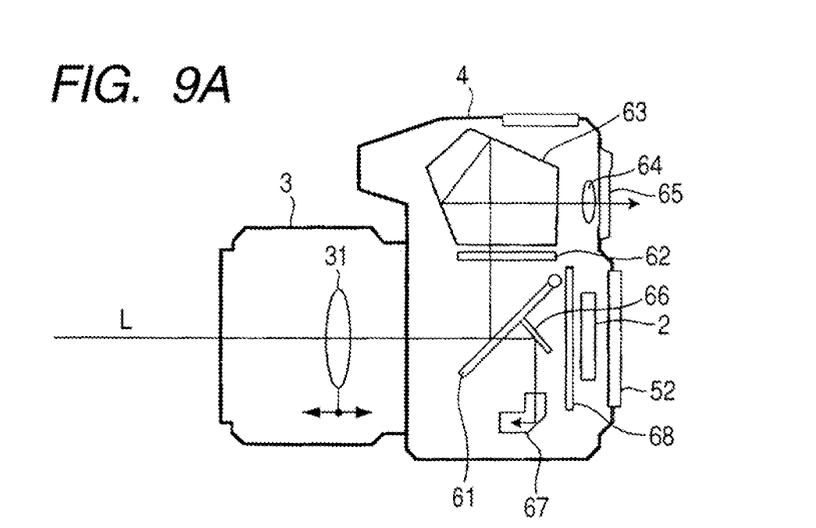
FIG. 9A is a diagram showing the internal configuration of the camera of FIGS. 8A and 8B.
Figure 9B:
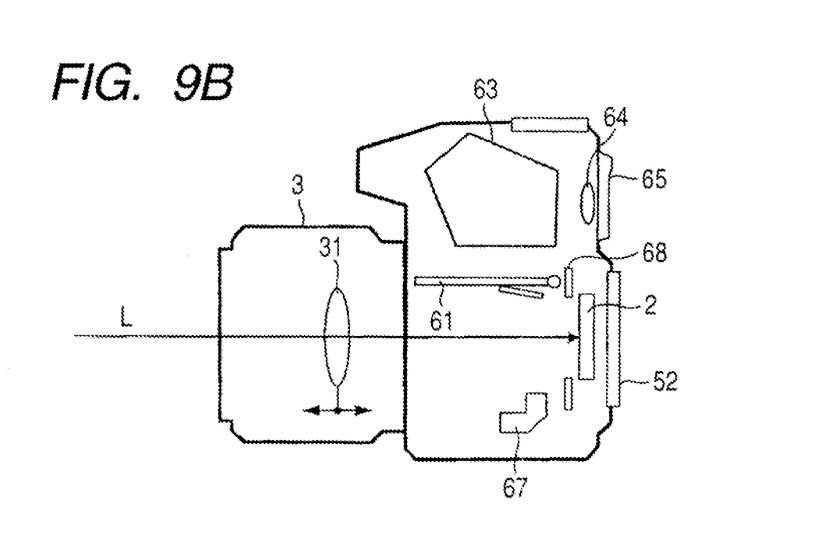
FIG. 9B is a diagram showing the internal configuration of the camera of FIGS. 8A and 8B.

Described next is the internal configuration of a still video camera of the invention. FIGS. 9A and 9B show the internal configuration of a still video camera of the invention. FIG. 9A is a side cross sectional view of the still video camera, showing the internal configuration in a shooting wait state, and FIG. 9B is a side cross sectional view of the still video camera, showing the internal configuration in a shooting (exposure) state.

As shown in FIGS. 9A and 9B, a luminous flux of the object after passing through a camera lens 31 of the interchangeable lens 3 is divided into two, i.e., a reflected luminous flux and a passing-through luminous flux, by a quick return mirror 61. The reflected luminous flux is image-formed on a reticle 62 for use for finder observation, and the resulting formed image of the object is observed from a finder eyepiece window 65 via a pentaprism 63 and a eyepiece lens 64. On the other hand, the passing-through luminous flux is, for use for auto focusing, reflected by a submirror 66 provided on the rear surface of the quick return mirror 61, and then is guided to a focus detection sensor 67. The focus detection sensor 67 detects focus information of the object. Behind the quick return mirror 61, the imaging unit 2 equipped therein the CCD 21 shown in FIG. 7 is attached via a shutter 68. The shutter 68 is so controlled as to open and close at the time of exposure. Note here that the shutter 68 is exemplified by a vertical-traveling focal plane shutter.

As shown in FIG. 9B, when the release switch 45 (shown in FIGS. 8A and 8B) of the camera is turned on, the quick return mirror 61 and the submirror 66 are jumped upward, and stopped in motion below the reticle 62. Thereafter, when the shutter 68 opens, the CCD 21 (shown in FIG. 7) is exposed. After exposure, the shutter 68 is closed, and the quick return mirror 61 and the submirror 66 return to their original positions.

Figure 10:
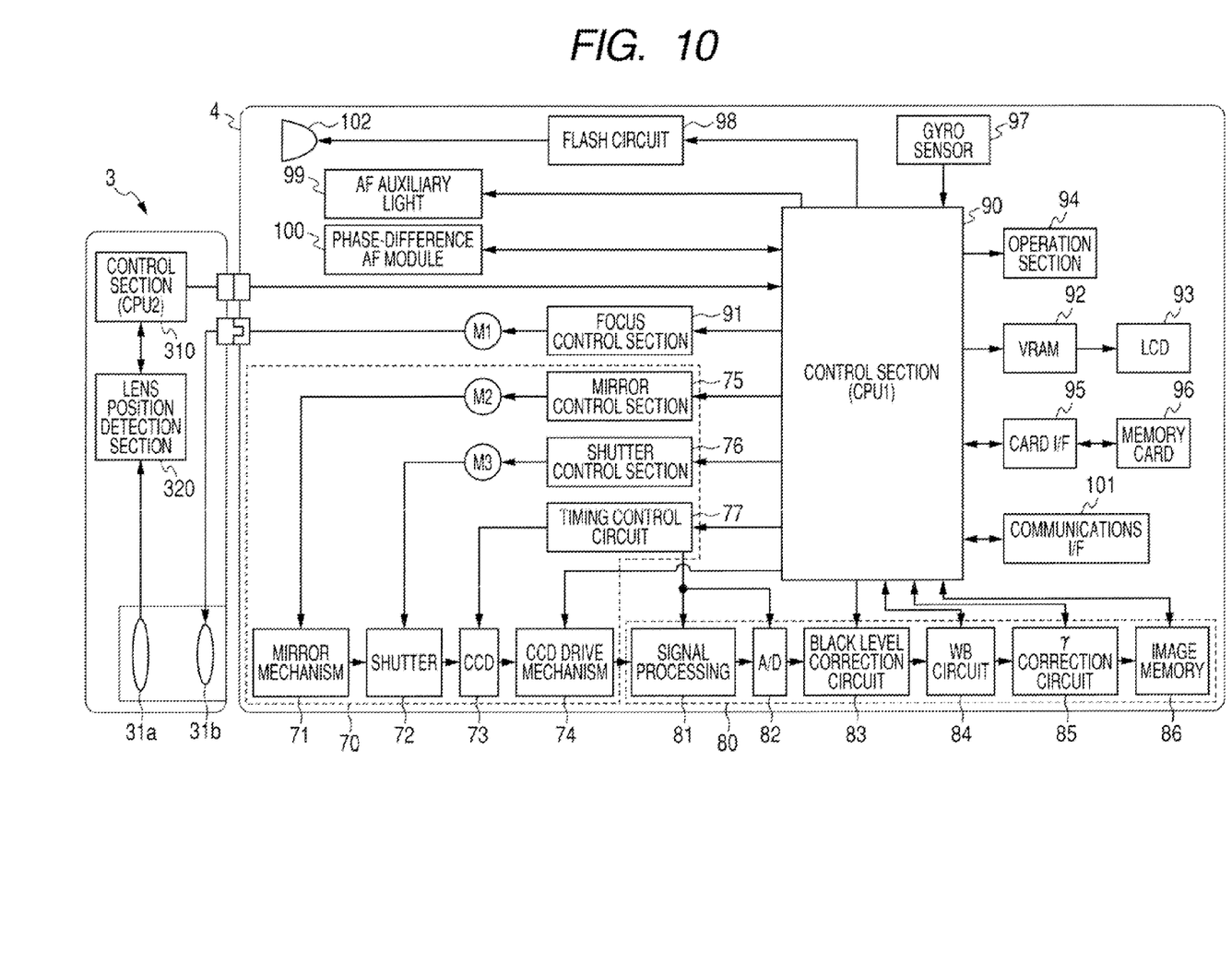
FIG. 10 is a control block diagram of the camera of FIGS. 8A and 8B.

FIG. 10 shows the block diagram showing an exemplary electrical configuration of the still video camera of the invention. The still video camera is provided with the camera body 4, the interchangeable lens 3, an imaging section 70, a signal processing section 80, a control section 90, a focus control section 91, an LCD (display section) 93, an operation section 94, and others.

The interchangeable lens 3 is provided with camera lenses 31a and 31b for image-forming of an object onto a CCD 73, a lens position detection section 320 for detecting the position of the camera lenses, and a control section 310 for exchanging various types of information with the control section 90 on the body side, and exercising control over various types of lenses.

The various types of lenses equipped in the interchangeable lens 3 are moved to their predetermined positions by a lens driving motor M1, which performs driving based on a control signal coming from the control section 90 via the focus control section 91.

The imaging section 70 serves to subject the image of an object coming via the interchangeable lens 3 to photoelectric conversion, and output the result as an image signal (electric image). It is provided with: a mirror mechanism 71; a shutter 72; the CCD (imaging device) 73; a CCD drive mechanism 74; a mirror control section 75; a shutter control section 76; and a timing control circuit 77.

The mirror mechanism 71 includes the quick return mirror 61 (shown in FIGS. 9A and 9B) and the submirror 66 (shown in FIGS. 9A and 9B), and divides a luminous flux of an object into a luminous flux for finder observation use and another for auto focusing use. At the time of imaging of the object, a motor M2 is driven based on a save signal coming from the mirror control section 75, and the quick return mirror 61 and the submirror 66 are moved away from the optical axis of the interchangeable lend 3. When an ON signal of the release switch 45 (shown in FIGS. 8A and 8B) is input to the control section 90, this save signal is generated by the control section 90, and is output to the mirror control section 75.

The shutter 72 opens and closes when the motor M3 is driven based on a signal coming from the shutter control section 76.

Based on a drive control signal (accumulation start signal/accumulation end signal) provided by the timing control circuit 77, the CCD 73 receives the image of the object for a predetermined exposure time for conversion into an image signal (electric charge accumulation signal), and sends out the image signal to the signal processing section 80 in accordance with a reading control signal (e.g., horizontal synchronizing signal, vertical synchronizing signal, transfer signal) provided by the timing control circuit 77. At this time, the image signal is separated into color components or R, G, and B for transmission to the signal processing section 80.

The CCD drive mechanism 74 is provided for moving the CCD 73 in such a direction of cancelling the camera shake. The two-direction camera shake detected by a gyro sensor 97 is converted by the control section 90 into a camera shake correction drive signal for transmission to the CCD drive mechanism 74. This drives the CCD drive mechanism 74.

Note that, in the below, for convenience of description, for the aim of distinguishing a reception signal of each of pixels and an image signal which is a group of the reception signals and constitutes a captured image, the reception signal of each of the pixels is referred to as a pixel signal (analog value) or pixel data (digital value) as required.

The timing control circuit 77 is provided for controlling the shooting operation of the CCD 73, and generates a shooting control signal based on a control signal coming from the control section 90. This shooting control signal includes a reference clock signal, a timing signal (synchronous clock signal) for subjecting, to signal processing in the signal processing section 80, the image signal provided by the CCD 73, and others. This timing signal is forwarded to an analog signal processing circuit 81 and an A/D conversion circuit 82 in the signal processing section 80.

The signal processing section 80 is provided for subjecting the image signal coming from the CCD 73 to predetermined analog signal processing and digital signal processing, and the signal processing to the image signal is executed for every pixel signal configuring the image signal. This signal processing section 80 is provided with: the analog signal processing circuit 81, the A/D conversion circuit 82, a black level correction circuit 83, a white balance (WB) circuit 84, a γ correction circuit 85, and an image memory 86. The black level correction circuit 83, the WB circuit 84, and the γ correction circuit 85 configure a circuit for applying the digital signal processing.

The analog signal processing circuit 81 is provided for applying predetermined analog signal processing to an image signal of an analog value coming from the CCD 73, and includes a CDS (correlated double sampling) circuit of reducing the sampling noise of the image signal, and an AGC (Auto Gain Control) circuit of performing level adjustment of the image signal. The AGC circuit also functions as compensating the not-sufficient level of the captured image when no appropriate exposure is derived by an f number provided in the interchangeable lens 3 and the exposure time of the CCD 73 (e.g., when an image of very low-bright object is captured). Note that the gain of the AGC circuit is set by the control section 90.

The A/D conversion circuit 82 is provided for converting the image signal coming from the analog signal processing circuit 81 into an image signal of a digital value (hereinafter, referred to as "image data"), and converts the pixel signal derived through light reception by each of pixels into 12-bit pixel data, for example. The black level correction circuit 83 is provided for correcting the black level of each of the A/D-converted pixel data to the reference black level.

The WB circuit 84 is provided for adjusting the white balance of the captured image, and adjusts the white balance of the captured image by converting the level of the pixel data for each of the color components R, G, and B using a level conversion table provided by the control section 90. Note that the conversion coefficient for each of the color components of the level conversion table is set for every captured image by the control section 90.

The γ correction circuit 85 is provided for performing gray scale correction by correcting the γ characteristics of the pixel data. It includes a plurality types of γ correction tables varying in γ characteristics as lookup tables (LUTs), and performs γ correction to the pixel data by any predetermined γ correction table in accordance with any set shooting scene. Note that in the γ correction process, the 14-bit pixel data is converted into 8-bit (256 levels of gray scale) pixel data. The reason why the pixel data before the γ correction process is 14-bit data is to prevent image degradation when the γ correction is performed with the high-nonlinearity γ characteristics. Moreover, the pixel data of each of the color components R, G, and B is subjected to predetermined level conversion in the WB circuit 84, and the resulting pixel data is subjected to γ correction using any corresponding γ correction table.

An image memory 86 is a memory for temporarily storing the image data through with the signal processing, and has the capacity enough for image data of a plurality of frames. Note that, in this embodiment, because the CCD 73 has 3002× 2000=6016000 pixels, the storage capacity available for image data of a frame is the capacity available for the 6016000 color pixel data.

An LCD (display section) 93 is provided with a VRAM 92. The VRAM 92 is a buffer memory for storing display images to the LCD 93, and has the memory capacity available for 400×300 color pixel data corresponding to the number of the LCD 93.

The operation section 94 includes a release switch that is turned on when the release button 45 (shown in FIGS. 8A and 8B) is fully depressed, the mode setting dial 44 (shown in FIGS. 8A and 8B), and others. Such operation information is forwarded to the control section 90.

The control section 90 is a CPU (Central Processing Unit), for example, and includes a ROM for storing a control program for control over the operation of the CPU being the control section 90, and a RAM for temporarily storing various types of data for use in the computation process or the control process, for example.

This control section 90 is connected to a memory card 96 via a card I/F 95. The card I/F 95 is an interface for writing of image data to the memory card 96 and reading of the image data therefrom. The memory card 96 records thereon the image data such as still images and moving images.

The control section 90 is connected to a communications I/F 101 such as USB terminal. This enables connection to a PC or others.

A flash 102 is for illuminating the object at the time of shooting in any dark place, and light emission is controlled by a flash circuit 98. A phase-difference AF module 100 is for deriving an AF signal, and an AF auxiliary light 99 is for deriving the image of an object for the phase-difference AF module 100 at the time of shooting in any dark place.

The invention claimed is:

1. An optical low-pass filter, comprising:
   a base material; and
   a coating layer formed to the base material on a light-entering-surface side, the coating layer including a plurality of high-refractive layers and a plurality of low-refractive layers sequentially disposed alternately on one on the other for reflecting or passing through a light of a specific wavelength range, wherein
   at least one high-refractive layer of the plurality of high-refractive layers is made of a transparent conductive material, different from a material of which the remaining high-refractive layers of the plurality high-refractive layers are made, to prevent attachment of dirt and dust to a surface of the coating layer,
   the at least one high-refractive layer has a greater layer thickness than a total layer thickness of refractive layers positioned to the light-entering-surface side of the at least one high-refractive layer, and
   a layer thickness of a low-refractive layer in contact with the at least one high-refractive layer on the opposite side of the light-entering-surface side is in a range of 140 to 220 nm.

2. The optical low-pass filter according to claim 1, wherein the coating layer blocks infrared radiation.

3. The optical low-pass filter according to claim 1 or 2, wherein the total layer thickness of the refractive layers positioned to the light-entering-surface side of the at least one high-refractive layer is 140 nm or smaller.

4. The optical low-pass filter according to claim 1 or 2, wherein the transparent conductive material is a mixture of indium oxide and tin oxide, and a mixture ratio of the indium oxide is 90 weight percentage or higher.

5. The optical low-pass filter according to claim 1 or 2, wherein the at least one high-refractive layer is the outermost layer of the coating layer on the light-entering-surface side.

6. The optical low-pass filter according to claim 1 or 2, wherein the outermost low-refractive layer includes at least two layers of an $MgF_2$ layer and an $SiO_2$ layer, and the $MgF_2$ layer and the $SiO_2$ layer are disposed in order from the light-entering-surface side.

7. The optical low-pass filter according to claim 6, wherein a layer thickness of the $MgF_2$ layer and that of the $SiO_2$ layer are each in a range of 20 to 80 nm.

8. An imaging unit, comprising:
   the optical low-pass filter of claim 1 or 2, and an imaging device, wherein the coating layer of the optical low-pass filter is connected to a ground potential.

9. The optical low-pass filter according to claim 1, wherein the layer thickness of the at least one high-refractive layer is in a range of 200 to 300 nm, and the total layer thickness of the refractive layers positioned to the light-entering-surface side of the at least one high-refractive layer is 140 nm or less.

10. The optical low-pass filter according to claim 1, wherein a ratio of the layer thickness of the at least one high-refractive layer to the total layer thickness of the refractive layers positioned to the light-entering-surface side of the at least one high-refractive layer is greater than 1.4.

11. The optical low-pass filter according to claim 1, wherein the material of the at least one high-refractive layer includes indium tin oxide (ITO).

12. The optical low-pass filter according to claim 11, wherein the material of the remaining high-refractive layers includes at least one of titanium oxide, tantalum oxide, a mixture of titanium oxide and lanthanum oxide, or a mixture of titanium oxide and tantalum oxide.

13. An optical low-pass filter, comprising:
    a base material; and
    a coating layer formed to the base material on a light-entering-surface side, the coating layer including a plurality of high-refractive layers and a plurality of low-refractive layers sequentially disposed alternately on one on the other for reflecting or passing through a light of a specific wavelength range, wherein
    at least one high-refractive layer of the plurality of high-refractive layers is made of a transparent conductive material, different from a material of which the remaining high-refractive layers of the plurality high-refractive layers are made, to prevent attachment of dirt and dust to a surface of the coating layer,
    the at least one high-refractive layer has a greater layer thickness than a total layer thickness of refractive layers positioned to the light-entering-surface side of the at least one high-refractive layer, and
    the outermost low-refractive layer includes at least two layers of an $MgF_2$ layer and an $SiO_2$ layer, and the $MgF_2$ layer and the $SiO_2$ layer are disposed in order from the light-entering-surface side.

14. The optical low-pass filter according to claim 13, wherein the transparent conductive material is a mixture of indium oxide and tin oxide, and a mixture ratio of the indium oxide is 90 weight percentage or higher.

15. The optical low-pass filter according to claim 13, wherein the at least one high-refractive layer is the outermost layer of the coating layer on the light-entering-surface side.

16. An optical low-pass filter, comprising:
    a base material; and
    a coating layer formed to the base material on a light-entering-surface side, the coating layer including a plurality of high-refractive layers and a plurality of low-refractive layers sequentially disposed alternately on one on the other for reflecting or passing through a light of a specific wavelength range, wherein
    at least one high-refractive layer of the plurality of high-refractive layers is made of a transparent conductive material, different from a material of which the remaining high-refractive layers of the plurality high-refractive layers are made, to prevent attachment of dirt and dust to a surface of the coating layer,
    the at least one high-refractive layer has a greater layer thickness than a total layer thickness of refractive layers positioned to the light-entering-surface side of the at least one high-refractive layer, and the layer thickness of the at least one high-refractive layer is in a range of 200 to 300 nm, and the total layer thickness of the refractive layers positioned to the light-entering-surface side of the at least one high-refractive layer is 140 nm or less.

17. The optical low-pass filter according to claim 16, wherein the material of the least one high-refractive layer includes indium tin oxide (ITO), and the material of the remaining high-refractive layers includes at least one of titanium oxide, tantalum oxide, a mixture of titanium oxide and lanthanum oxide, or a mixture of titanium oxide and tantalum oxide.

* * * * *

UNITED STATES PATENT AND TRADEMARK OFFICE
CERTIFICATE OF CORRECTION

| | | |
|---|---|---|
| PATENT NO. | : 8,437,084 B2 | Page 1 of 1 |
| APPLICATION NO. | : 11/909260 | |
| DATED | : May 7, 2013 | |
| INVENTOR(S) | : Tsujimura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this
Tenth Day of March, 2015

Michelle K. Lee
*Deputy Director of the United States Patent and Trademark Office*